United States Patent
Neill et al.

(10) Patent No.: US 11,593,696 B2
(45) Date of Patent: Feb. 28, 2023

(54) FREQUENCY TUNABLE QUBIT CONTROL STRATEGY

(71) Applicant: Google LLC, Mountain View, CA (US)

(72) Inventors: Charles Neill, Goleta, CA (US); Anthony Edward Megrant, Goleta, CA (US); Yu Chen, Goleta, CA (US)

(73) Assignee: Google LLC, Mountain View, CA (US)

( * ) Notice: Subject to any disclaimer, the term of this patent is extended or adjusted under 35 U.S.C. 154(b) by 307 days.

(21) Appl. No.: 16/870,372

(22) Filed: May 8, 2020

(65) Prior Publication Data

US 2023/0032766 A1     Feb. 2, 2023

Related U.S. Application Data

(60) Provisional application No. 62/846,029, filed on May 10, 2019.

(51) Int. Cl.
    *G06N 10/00*         (2022.01)

(52) U.S. Cl.
    CPC ..................... *G06N 10/00* (2019.01)

(58) Field of Classification Search
    CPC ........ G06N 10/00; G06N 10/20; G06N 10/40; Y10S 977/933
    See application file for complete search history.

(56) References Cited

U.S. PATENT DOCUMENTS

| | | | |
|---|---|---|---|
| 9,647,662 B1 * | 5/2017 | Abutaleb | H03K 19/017545 |
| 2018/0032893 A1 * | 2/2018 | Epstein | G06N 10/00 |
| 2019/0007051 A1 * | 1/2019 | Sete | H03K 19/195 |

OTHER PUBLICATIONS

Morimae et al. "Entanglement-fidelity relations for inaccurate ancilla-driven quantum computation", Nov. 17, 2010, pp. 1-8 (Year: 2010).*
International Preliminary Report on Patentability in International Appln. No. PCT/US2020/032063, dated Nov. 25, 2021, 8 pages.
Bialczak et al., "Demonstration of a Tuneable Coupler for Superconducting Qubits Using Coherent, Time Domain, Two-Qubit Operations," https://arxiv.org/abs/1007.2219, Jul. 2010, 23 pages.
Geller et al., "Tunable coupler for superconducting Xmon qubits: Perturbative nonlinear model," https://arxiv.org/abs/1405.1915, May 2014, 10 pages.
Harris et al., "Sign- and magnitude-tunable coupler for superconducting flux qubits," https://arxiv.org/abs/cond-mat/0608253v4, last revised Jul. 2007, 5 pages.
Neill et al., "A blueprint for demonstrating quantum supremacy with superconducting qubits," https://arxiv.org/abs/1709.06678, Sep. 2017, 22 pages.

(Continued)

*Primary Examiner* — Daniel D Chang
(74) *Attorney, Agent, or Firm* — Fish & Richardson P.C.

(57) ABSTRACT

Methods, systems and apparatus for implementing a target two-qubit quantum logic gate on a first qubit and second qubit using a tunable qubit coupler. In one aspect, a method includes generating a control signal for the target two-qubit quantum logic gate according to a control model, wherein the control model comprises a controlled-Z operator and a swap operator that are non-orthogonal; and applying the control signal to the first qubit, second qubit and tunable qubit coupler.

27 Claims, 6 Drawing Sheets

(56) References Cited

OTHER PUBLICATIONS

Yan et al., "A tunable coupling scheme for implementing high-fidelity two-qubit gates," https://arxiv.org/abs/1803.09813, Mar. 2018, 10 pages.
Kranzt et al., "A Quantum Engineer's Guide to Superconducting Qubits," Applied Physics Reviews, Jun. 2019, 6(021318):1-66.
Morimae et al., "Entanglement-fidelity relations for inaccurate ancilla-driven quantum computation," Phys. Rev. A., Nov. 2010, 82:1-8.
PCT International Search Report and Written Opinion in International Appln. No. PCT/US2020/032063, dated Aug. 20, 2020, 15 pages.

\* cited by examiner

500 

```
┌─────────────────────────────────────────┐
│ Generate control signal according to control │
│ model, wherein the control model includes an │
│ approximate controlled Z operator and an │
│ approximate swap operator that are non- │
│                orthogonal           502 │
└─────────────────────────────────────────┘
                    │
                    ▼
┌─────────────────────────────────────────┐
│ Apply generated control signal to first qubit and │
│              second qubit               │
│                                     504 │
└─────────────────────────────────────────┘
```

*FIG. 5*

FREQUENCY TUNABLE QUBIT CONTROL STRATEGY

CROSS-REFERENCE TO RELATED APPLICATION

This application claims priority under 35 U.S.C. 119 to Provisional Application No. 62/846,029, filed May 10, 2019, all of which are incorporated by reference.

BACKGROUND

This specification relates to quantum computing.

Classical computers have memories made up of bits, where each bit can represent either a zero or a one. Quantum computers maintain sequences of quantum bits, called qubits, where each quantum bit can represent a zero, one or any quantum superposition of zeros and ones. Quantum computers operate by setting qubits in an initial state and controlling the qubits, e.g., according to a sequence of quantum logic gates.

SUMMARY

This specification describes control strategies for implementing quantum algorithms using frequency tunable qubits.

In general, one innovative aspect of the subject matter described in this specification can be implemented in a method for implementing a target two-qubit quantum logic gate on a first qubit and second qubit using a tunable qubit coupler, the method comprising: generating a control signal for the target two-qubit quantum logic gate according to a control model, wherein the control model comprises a controlled-Z operator and a swap operator that are non-orthogonal; and applying the control signal to the first qubit, second qubit and tunable qubit coupler.

Other implementations of these aspect include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the control model further comprises one or more detuning operators and a frequency shift operator.

In some implementations the control model is photon-conserving.

In some implementations the control model comprises a first detuning operator multiplied by the swap operator multiplied by the controlled-Z operator multiplied by a second detuning operator multiplied by the frequency shift operator.

In some implementations the control model is given by $$U = e^{-i(\hat{I}\hat{Z}-\hat{Z}\hat{I})\delta_{-a}/4} e^{-i(\hat{X}\hat{X}+\hat{Y}\hat{Y})\theta/2} e^{-i\hat{Z}\hat{Z}\phi/4} e^{-i(\hat{I}\hat{Z}-\hat{Z}\hat{I})\delta_{-b}/4} e^{-i(\hat{I}\hat{Z}-\hat{Z}\hat{I})\delta_{+}/4}$$

where $\hat{I}$ represents the identity operator, $\hat{X}$ represents the Pauli-X operator, $\hat{Y}$ represents the Pauli-Y operator, $\hat{Z}$ represents the Pauli-Z operator, $\delta_{-a}$, $\delta_{-b}$ represent detuning operation parameters, $\theta$ represents a swap angle and $\phi$ represents a controlled-Z phase angle.

In some implementations generating the control signal for the target two-qubit quantum logic gate according to the control model comprises: determining values of the detuning operation parameters, swap angle and phase angle such that the control model represents the action of the target two-qubit quantum logic gate on the first qubit and the second qubit; and generating the control signal based on the determined values.

In some implementations application of the control signal to the first qubit, second qubit and tunable qubit coupler realizes the target two-qubit evolution with accuracy above a predetermined threshold.

In some implementations determining values of the detuning operation parameters, swap angle and phase angle comprises setting the detuning operation parameters, swap angle and phase angle to respective values that have been determined through a calibration procedure, the calibration procedure comprising: for each set of values of qubit control parameters from multiple sets of values of qubit control parameters: performing a cross-entropy benchmarking experiment using the set of values for the qubit control parameters to identify a unitary transformation realized by the set of values of qubit control parameters, comprising determining values of the control model parameters that maximize the fidelity of the identified unitary transformation; storing data linking the set of values of qubit control parameters, the unitary transformation the set of values realizes, and corresponding determined values of control model parameters; interpolating over the stored data to determine unitary transformations and the control model parameters corresponding to sets of values of qubit control parameters that are not included in the multiple sets of values of qubit control parameters.

In some implementations qubit control parameters comprise qubit voltage, qubit coupler voltage and pulse length.

In some implementations applying the control signal to the first qubit, the second qubit and the tunable qubit coupler comprises: applying a first pulse to the first qubit and second qubit, wherein the first pulse detunes the first qubit and second qubit; applying a second pulse to the tunable coupler that couples the first qubit and the second qubit, wherein the second pulse implements the swap operator; and applying a third pulse to the tunable coupler and one of the first qubit or second qubit, wherein the third pulse implements the controlled-Z operator.

In some implementations applying a second pulse to the tunable coupler further comprises adjusting the frequency of the first and second qubit such that the first qubit and second qubit are on resonance.

In some implementations applying the third pulse to the tunable coupler and one of the first qubit or second qubit comprises adjusting the frequency of the first qubit or second qubit.

In some implementations the first pulse comprises one or more square pulses.

In some implementations the second pulse comprises a smooth pulse.

In some implementations the method further comprises implementing a sequence of target two-qubit quantum logic gates, the method comprising: for each target two-qubit quantum logic gate: generating a control signal for the target two-qubit quantum logic gate according to a control model, wherein the control model comprises a controlled-Z operator and a swap operator that are non-orthogonal; and applying the control signal to a first qubit and a second qubit; and for a last target two-qubit quantum logic gate in the sequence of target two-qubit quantum logic gates, measuring the first qubit and second qubit in the Z basis.

In general, another innovative aspect of the subject matter described in this specification can be implemented in a method for implementing a two-qubit quantum logic gate using a first qubit, a second qubit and a tunable qubit coupler, wherein implementing the two-qubit gate comprises implementing a controlled-Z operation and implementing a swap operation, wherein the controlled-Z operation and the swap operation are non-orthogonal.

Other implementations of these aspect include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations implementing the two-qubit quantum logic gate using a first qubit, a second qubit and a qubit coupler comprises: applying a first pulse to the first qubit and second qubit, wherein the first pulse detunes the first qubit and second qubit; applying a second pulse to the tunable coupler that couples the first qubit and the second qubit, wherein the second pulse implements the swap operator; and applying a third pulse to the tunable coupler and one of the first qubit or second qubit, wherein the third pulse implements the controlled-Z operator.

In some implementations applying the second pulse to the tunable coupler further comprises adjusting the frequency of the first and second qubit such that the first qubit and second qubit are on resonance.

In some implementations applying the third pulse to the tunable coupler and one of the first qubit or second qubit comprises adjusting the frequency of the first qubit or second qubit.

In some implementations the first pulse comprises one or more square pulses.

In some implementations the second pulse comprises a smooth pulse.

In some implementations the first pulse, second pulse, and third pulse are determined using a photon conserving control model given by $$U = e^{-i(\hat{I}\hat{Z}-\hat{Z}\hat{I})\delta_{-a}/4} e^{-i(\hat{X}\hat{X}+\hat{Y}\hat{Y})\theta/2} e^{-i\hat{Z}\hat{Z}\phi/4} e^{-i(\hat{I}\hat{Z}-\hat{Z}\hat{I})\delta_{-b}/4} e^{-i(\hat{I}\hat{Z}-\hat{Z}\hat{I})\delta_{+}/4}$$

where $\hat{I}$ represents the identity operator, $\hat{X}$ represents the Pauli-X operator, $\hat{Y}$ represents the Pauli-Y operator, $\hat{Z}$ represents the Pauli-Z operator, $\delta_{-a}$, $\delta_{-b}$ represent detuning operation parameters, $\theta$ represents a swap angle for the swap operator and $\phi$ represents a controlled-Z phase angle for the controlled-Z operator.

In some implementations determining the first pulse, second pulse and third pulse using the control model comprises: determining values of the detuning operation parameters, swap angle and phase angle such that the control model represents the action of the target two-qubit quantum logic gate on the first qubit and the second qubit.

In some implementations determining values of the detuning operation parameters, swap angle and phase angle comprises setting the detuning operation parameters, swap angle and phase angle to respective values that have been determined through a calibration procedure, the calibration procedure comprising: for each set of values of qubit control parameters from multiple sets of values of qubit control parameters: performing a cross-entropy benchmarking experiment using the set of values for the qubit control parameters to identify a unitary transformation realized by the set of values of qubit control parameters, comprising determining values of the control model parameters that maximize the fidelity of the identified unitary transformation; storing data linking the set of values of qubit control parameters, the unitary transformation the set of values realizes, and corresponding determined values of control model parameters; interpolating over the stored data to determine unitary transformations and the control model parameters corresponding to sets of values of qubit control parameters that are not included in the multiple sets of values of qubit control parameters.

In some implementations qubit control parameters comprise qubit voltage, qubit coupler voltage and pulse length.

In some implementations implementing the two-qubit quantum logic gate comprises implementing the two-qubit quantum logic gate with accuracy above a predetermined threshold.

The subject matter described in this specification can be implemented in particular ways so as to realize one or more of the following advantages.

A system implementing individual or sequences of two-qubit quantum logic gates using the techniques described in this specification can provide an improvement in the speed at which swap gates and controlled-z gates are performed. For example, any swap gate and controlled-z gate (together with single qubit gates such as z rotations) can be implemented in 35 ns. In contrast, other methods such as, e.g., those that decompose computations into controlled-Z and pi pulses, may require several hundred nano seconds or more.

The control model and control sequences described in this specification can be used to efficiently generate any gate set required for near term applications of quantum computers, e.g., variational eigensolvers, quantum approximate optimization algorithms or quantum supremacy experiments, thus enabling the realization of such devices and improving their functionality.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a flow chart of an example process for implementing a target two-qubit quantum logic gate.

Like reference numbers and designations in the various drawings indicate like elements.

DETAILED DESCRIPTION

Overview

This specification describes experimental control strategies for implementing quantum algorithms such as variational quantum eigensolvers (VQE)—a strategy for implementing quantum chemistry routines, quantum approximate optimization algorithms (QAOA)—a strategy for implementing combinatorial optimization algorithms on a quantum computer, or quantum supremacy algorithms using frequency tunable qubits, e.g., transmon qubits.

Alternative control strategies implement quantum algorithms within the context of variational quantum eigensolvers and quantum approximate optimization algorithms by decomposing the algorithms into single qubit gates, e.g., $\pi$ and $\pi/2$ rotations, and two-qubit controlled-Z (CZ) quantum logic gates. However, these decompositions are extremely inefficient. For example, implementing such decompositions without leakage to non-computational states is nearly impossible. In addition, implementing CZ gates typically introduces unwanted swap behavior. To avoid such unwanted behavior and achieve high fidelity CZ gates, CZ gate execution time is increased.

This specification describes methods and systems for efficient, low-leakage implementation of two-qubit quantum logic gates. As an example, the described methods and systems enable efficient implementation of the quantum gate sets required for algorithms such as VQE, QAOA and quantum supremacy.

A parameterized control model that describes any two-qubit evolution that conserves photon number, i.e., any two-qubit operation that a quantum computer may be required to perform, is presented. The control model includes a swap operator and a CZ operator that are intentionally non-orthogonal to each other. The control model can be used to generate a control signal that, when applied to two qubits, implements a target two-qubit quantum logic gate. The control signal includes a sequence of control pulses. A first control pulse detunes the first qubit and second qubit. A second control pulse implements a swap quantum logic gate on the first and second qubit. A third control pulse implements a CZ quantum logic gate on the first and second qubit. By sacrificing local fidelity of the swap quantum logic gate and the CZ quantum logic gate, global fidelity and execution speed of the two-qubit evolution as a whole is increased. Quantum algorithms can therefore be more reliably and efficiently executed.

Example Operating Environment

Figure 1:
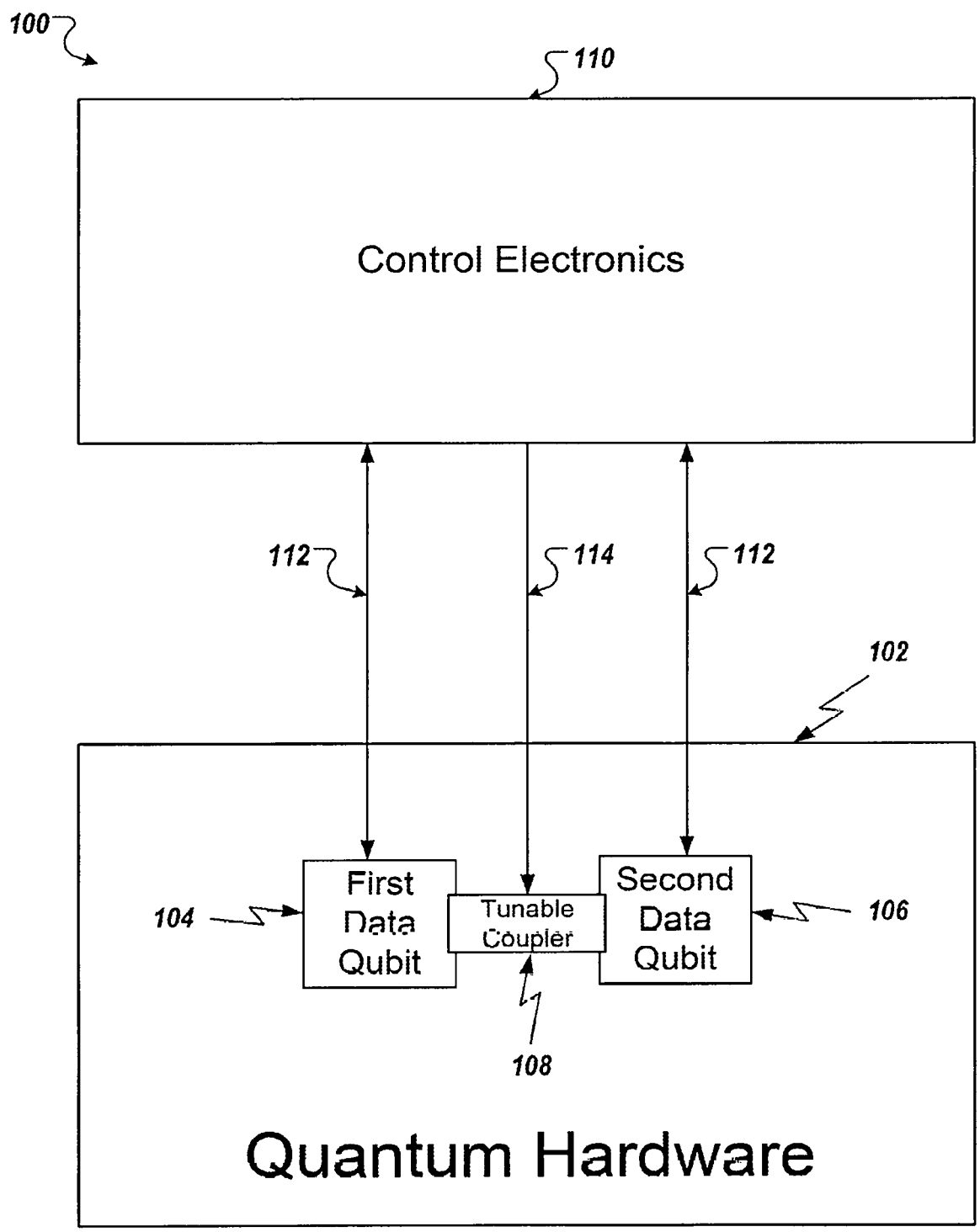
FIG. 1 depicts an example system for implementing two-qubit gates with a tunable coupler.

FIG. 1 is an example system that can perform the method described with reference to FIG. 5.

The system 100 includes quantum hardware 102 that includes at least a first qubit 104, a second qubit 106, and a tunable coupler 108 between the first qubit and the second qubit. The first qubit 104, the second qubit 106, and the tunable coupler 108 may be subcomponents of the quantum hardware 102. For example, quantum hardware 102 may include additional components for performing quantum or classical computations, e.g., additional qubits, additional tunable couplers, additional control electronics and processors.

Each of the first qubit 104, the second qubit 106, and the tunable coupler 108 are frequency-tunable. In some implementations the first qubit 104 and the second qubit 106 may be superconducting qubits. For example, the first qubit 104 and the second qubit 106 may be transmon qubits. In other implementations other qubit architectures may be used instead.

Various different tunable coupler designs may be used. For example, in some implementations the tunable coupler 108 may include a three-terminal device constructed from superconductor materials using a fixed negative mutual inductance and a single, current-biased Josephson junction that acts as a tunable positive inductance. Further discussion and examples of tunable couplers are described in detail in "A tunable coupling scheme for implementing high-fidelity two-qubit gates," Fei Yan et al., arxiv:quant-ph/180309813v1, "Demonstration of a Tuneable Coupler for Superconducting Qubits Using Coherent, Time Domain, Two-Qubit Operations," R. C. Bialczak et al., arxiv: quant-ph/1007.2219v1, "Sign- and magnitude-tunable coupler for superconducting flux qubits," and R. Harris et al., arxiv: cond-mat/0608253v4, "Tunable coupler for superconducting Xmon qubits: Perturbative nonlinear model," Michael R. Geller et al., arxiv:quant-ph/1405.1915v1, each of which is incorporated herein by reference in its entirety.

The system 100 includes control electronics 110. Control electronics 110 includes control devices that may operate the quantum hardware. For example, control electronics 110 may include an arbitrary waveform generator.

The system 100 includes qubit control lines 112 from the control electronics 110 to the first qubit 104 and the second qubit 106, respectively. For example, the frequency of the first qubit 104 and the second qubit 106 can be tuned using qubit control lines 112. The frequency of the first qubit 104 and the second qubit 106 may be tuned by applying control signals to the qubit control lines 112 via control electronics 110. In addition, control electronics 110 can perform measurements of the first qubit 104 and the second qubit 106 through qubit control lines 112. Measurement of the first qubit 104 and measurement of the second qubit 106 determines the state of the first qubit 104 and the second qubit 106, respectively. Control electronics 110 can store, display, and/or further process the results of each of the measurements of the first qubit 104 and the second qubit 106.

The system 100 includes tunable coupler control line 114. Control electronics 110 can dynamically tune the coupling or interaction between the first qubit 104 and the second qubit 106 by applying control signals to the tunable coupler control line 114 to tune the tunable coupler 108 frequency. For example, control electronics 110 may apply a voltage pulse to the tunable coupler control line 114 to tune the tunable coupler 108 frequency. In some implementations, the control electronics 110 may include a data processing apparatus and associated memory. The memory may include a computer program having instructions that, when executed by the data processing apparatus, cause the data processing apparatus to perform one or more functions described herein, such as applying a control signal to a qubit and/or to a tunable coupler.

Figure 2:
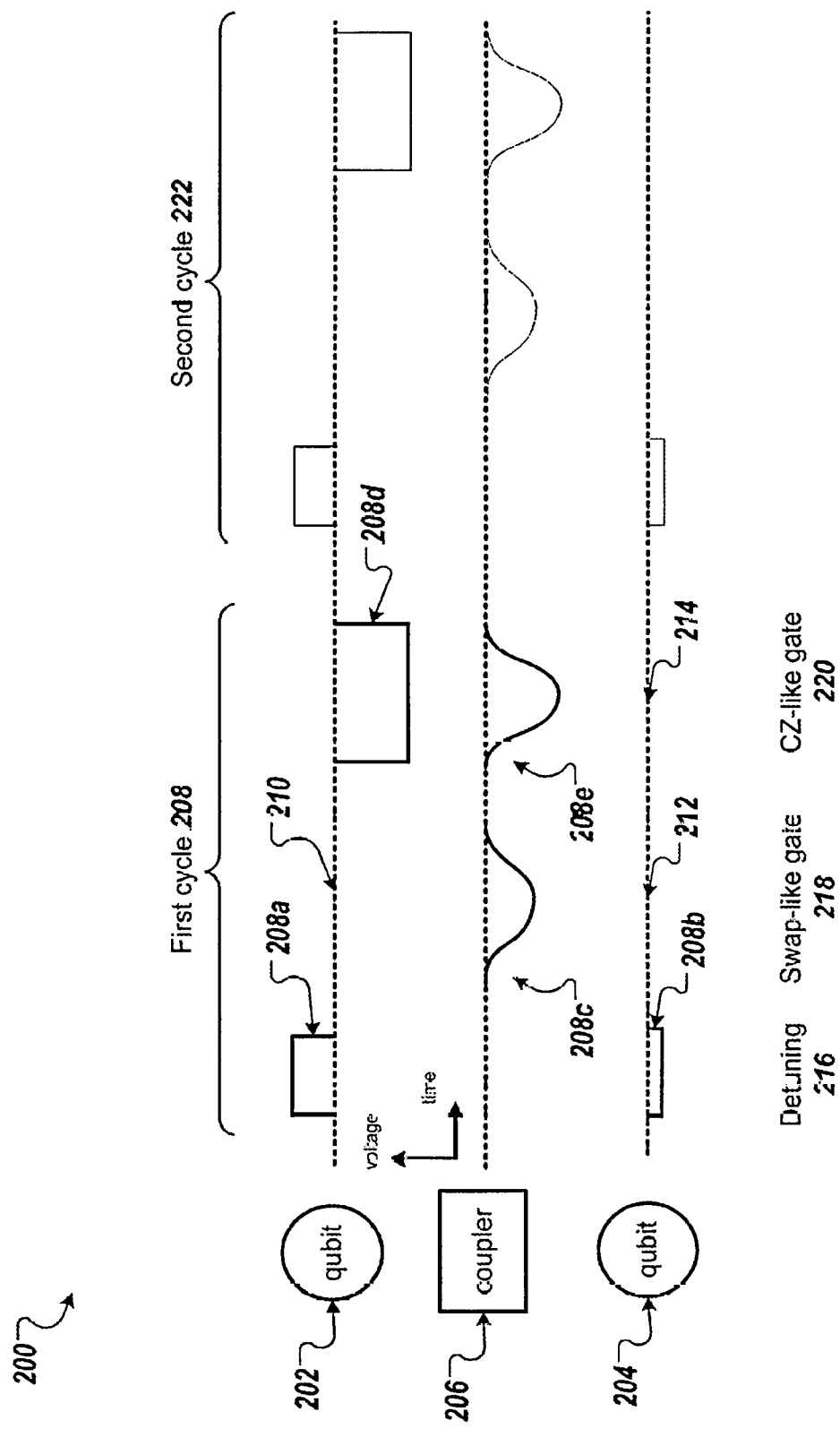
FIG. 2 depicts an example implementation of a two-qubit quantum logic gate.

FIG. 2 is an illustration 200 of an example implementation of a two-qubit quantum logic gate. The illustration 200 is an example of an implementation of a two-qubit quantum logic gate performed by the system 100 of FIG. 1.

In the illustration 200, a two-qubit quantum logic gate is applied to a first qubit 202 and a second qubit 204 through application of a control signal to the first qubit 202, second qubit 204 and a tunable coupler 206 coupling the first qubit 202 and second qubit 204. For example, the first qubit 202, second qubit 204, tunable coupler 206 and control signal may correspond to the first qubit 104, second qubit 106, tunable coupler 108 and control signal generated by the control electronics 110 and applied via the tunable coupler control line 114 of FIG. 1. Throughout this specification, application of a control signal is understood to include application of a collection of multiple control signals, in which individual control signals are applied to either the first qubit, the second qubit or the coupler.

The control signal is a generated according to a control model. The control model represents a unitary transformation that describes any two qubit evolution with low leakage. In some implementations the control model may be photon conserving—an important property in quantum chemistry where particle number must be conserved during evolution. The control model includes a product of terms, including a controlled-Z operator and a swap operator.

A controlled-Z operator is a quantum logic gate that acts on two or more qubits, where one or more qubits act as a control for a Pauli-Z operation. For example, a two-qubit controlled-Z operator is a quantum logic gate that acts on two qubits, where a first qubit acts as a control, and performs a Pauli-Z operation on the second qubit only when the first qubit is in the 1 state. With respect to the basis 00, 01, 10, 11 a two-qubit controlled-Z operator may be represented by the matrix $$C(Z) = \begin{pmatrix} 1 & 0 & 0 & 0 \\ 0 & 1 & 0 & 0 \\ 0 & 0 & 1 & 0 \\ 0 & 0 & 0 & -1 \end{pmatrix}$$

The action of the two-qubit controlled-Z operator is to add a phase to the 11 state when the first qubit is in the 1 state.

A swap operator is a quantum logic gate that acts on two qubits and swaps the states of two qubits. With respect to the basis 00, 01, 10, 11 a swap operator may be represented by the matrix $$SWAP = \begin{pmatrix} 1 & 0 & 0 & 0 \\ 0 & 0 & 1 & 0 \\ 0 & 1 & 0 & 0 \\ 0 & 0 & 0 & 1 \end{pmatrix}$$

The action of the swap operator is to exchange the states 01↔10.

Implementing high fidelity controlled-Z and swap operations, e.g., using hardware similar or identical to that described with reference to FIG. 1, can be difficult. For example, if a controlled-Z operation is performed too quickly, unwanted swap behavior can occur. That is, instead of only adding a phase to the 11 state, performing the controlled-Z operation too quickly may result in addition of a phase to the 11 state and exchange of the states 10 and 01. Similarly, if a swap operation is performed too quickly, unwanted phases may accumulate on the 11 state. That is, instead of performing a clean exchange of the states 01 and 10, the action of the swap operation may be an exchange of the states 10 and 01 and an addition of a phase on the 11 state. To overcome these difficulties, controlled-Z operations and swap operations are typically performed slowly, e.g., taking several hundred nanoseconds. This in turn results in slow algorithm execution times.

The control model described in this specification includes a controlled-Z operator and a swap operator. The controlled-Z operator and swap operators are non-orthogonal. Therefore, application of the controlled-Z operator intentionally incurs swap behavior, and application of the swap operator intentionally adds a phase to the 11 state. Implementing the controlled-Z operators and swap operators therefore takes less time than high-fidelity controlled-Z and swap operators, e.g., 20 or 14 nanoseconds, as described in more detail below with reference to FIGS. 3 and 4.

The control model may also include one or more detuning operators and a frequency shift operator. For example, the control model may be given by $$U = \underbrace{e^{-i(\hat{I}\hat{Z}-\hat{Z}\hat{I})\delta_{-a}/4}}_{\text{Detuning}} \underbrace{e^{-i(\hat{X}\hat{X}+\hat{Y}\hat{Y})\theta/2}}_{\text{Approximate swap}} \underbrace{e^{-i\hat{Z}\hat{Z}\phi/4}}_{\substack{\text{Approximate}\\CZ}} \underbrace{e^{-i(\hat{I}\hat{Z}-\hat{Z}\hat{I})\delta_{-b}/4}}_{\text{Detuning}} \underbrace{e^{-i(\hat{I}\hat{Z}-\hat{Z}\hat{I})\delta_{+}/4}}_{\text{Frequency shift}}$$

where $\hat{I}$ represents the identity operator, $\hat{X}$ represents the Pauli-X operator, $\hat{Y}$ represents the Pauli-Y operator, $\hat{Z}$ represents the Pauli-Z operator, $\delta_{-a}$, $\delta_{-b}$ represent detuning operation parameters, $\theta$ represents a swap angle, $\phi$ represents a controlled-Z phase angle and $\delta_{+b}$ represents a frequency shift parameter. For notational conciseness, in the above equation the first operator in a product of Pauli operators is taken to act on the first qubit and the second operator in a product of two operators is taken to act on the second qubit. For example, the product IZ means apply an identity operator to the first qubit and a Pauli Z operator to the second qubit. Equivalently, the products may be re-written as, e.g. $X_1 X_2$ where the suffix indicates which of the qubits the operator is acting on.

The control model U describes any operation that the quantum hardware and control electronics of FIG. 1 can perform. For example, the control model U may describe gate sets required for VQE, QAOA and quantum supremacy experiments. Therefore, to implement a target two qubit quantum logic gate with an accuracy above a predetermined threshold, values of the detuning operation parameters, swap angle, phase angle and frequency shift parameter that generate an instance of the control model U representing the action of the target two-qubit quantum logic gate on two qubits are determined, e.g., through the calibration process described below with reference to FIG. 6. The values are then used to generate a control signal that is applied to the two qubits 202, 204 and the tunable coupler 206.

The control signal includes a sequence of pulses, e.g., pulses 208a-e that are applied to the first qubit 202, second qubit 204 and tunable coupler 206. The sequence of pulses includes a first pulse 208a and second pulse 208b that detune the first qubit 202 and the second qubit 204. That is, the first pulse 208a sets the operating frequency of the first qubit 202 to a first value. The second pulse 208b sets the operating frequency of the second qubit 204 to a second value, where the first value and second value are separated by a predetermined distance that does not allow the qubits 202, 204 to interact with each other (i.e. there is no, or a negligible, interaction between the qubits). The specific values are dependent on the physical realizations of the qubits 202, 204 and may vary. As illustrated in FIG. 2, the shape of the first pulse 208a and the second pulse 208b may be square to allow for fast qubit detuning. In some cases the pulses 208a and 208b can be applied approximately simultaneously, e.g., as a single control pulse.

The sequence of pulses includes a third pulse 208c that is applied to the tunable coupler 206 and that implements the swap operator. When the third pulse 208c is applied to the tunable coupler 206, the first qubit 202 and second qubit 204 are on resonance. Generally, in FIG. 2 the qubits can be assumed to be on resonance and only move out of resonance when a voltage is applied to the qubits. At step 210 and 212 no pulse is applied and the qubits are therefore assumed to be resonant during the swap-like gate. As illustrated in FIG. 2, the shape of the second pulse 208b may be smoothed, e.g., by a Gaussian filter with a bandwidth ranging from 60 MHz to 100 MHz, to avoid leakage.

The sequence of pulses includes a fourth pulse 208d that is applied to the first qubit 202 to set the operating frequency of the first qubit 202 to a third value. For convenience, the first, second and third values represented by (the amplitudes of the) pulses 208a, 208b and 208d are illustrated in FIG. 2 as being different values, however the values may vary and in some cases may be the same. As illustrated in FIG. 2, the shape of the fourth pulse may be square to allow for fast setting of the first qubit operating frequency.

The sequence of pulses includes a fifth pulse 208e that is applied to the tunable coupler 206 and that implements the controlled-Z operator. When the fifth pulse 208e is applied to the tunable coupler 206, the difference between the first qubit 202 and second qubit 204 frequencies is a fixed value. This difference can be achieved by detuning one of the qubits, the other qubit, or both qubits. As illustrated in FIG. 2, the shape of the fifth pulse 208d may be smooth to avoid leakage. In some cases the pulses 208d and 208e can be applied approximately simultaneously, e.g., as a single control pulse.

The sequence of pulses 208a-e can be separated into three stages. The first stage is a detuning stage 216 that includes application of pulses 208a and 208b and corresponds to the detuning operators included in the control model U. The second stage is a swap stage 218 that includes application of pulse 208c and corresponds to the swap operator included in the control model U. The third stage 220 is a CZ stage 220 that includes application of pulses 208d and 208e and corresponds to the CZ operator included in the control model U. In each stage, pulses in the stage can be applied approximately simultaneously.

The sequence of pulses 208a-e can correspond to a first cycle 208 in one of multiple cycles 208, 222, where the first cycle 208 represents implementation of a first quantum logic gate in a sequence of multiple quantum logic gates that performs a specific computation or algorithm. When multiple cycles of sequences of pulses are implemented, the last frequency shift operator in the control model for a preceding two-qubit quantum logic gate in the sequence can be combined with the first detuning operator in the control model for a current two-qubit quantum logic gate in the sequence. This is why the sequence of pulses 208a-e does not include a frequency shift stage.

When multiple cycles of a sequence of pulses are performed, the qubits 202, 204 may be measured in the Z-basis. This negates the requirement of implementing the final frequency shift operator in the control model corresponding to a final quantum logic gate in the sequence of quantum logic gates. Alternatively or in addition, one or more single qubit rotation operations may be implemented on the first qubit 202 and second qubit 204 prior to measurement. In other words, the control model U includes 5 terms but the pulse sequence shown in FIG. 2 has 3 sections 216, 218, and 220. When constructing a long sequence of gates, neighboring z-rotations can be combined. This produces 3 terms everywhere except for at the end where an additional z-rotation remains, but this can be ignored when measuring in the z-basis.

Figure 3:
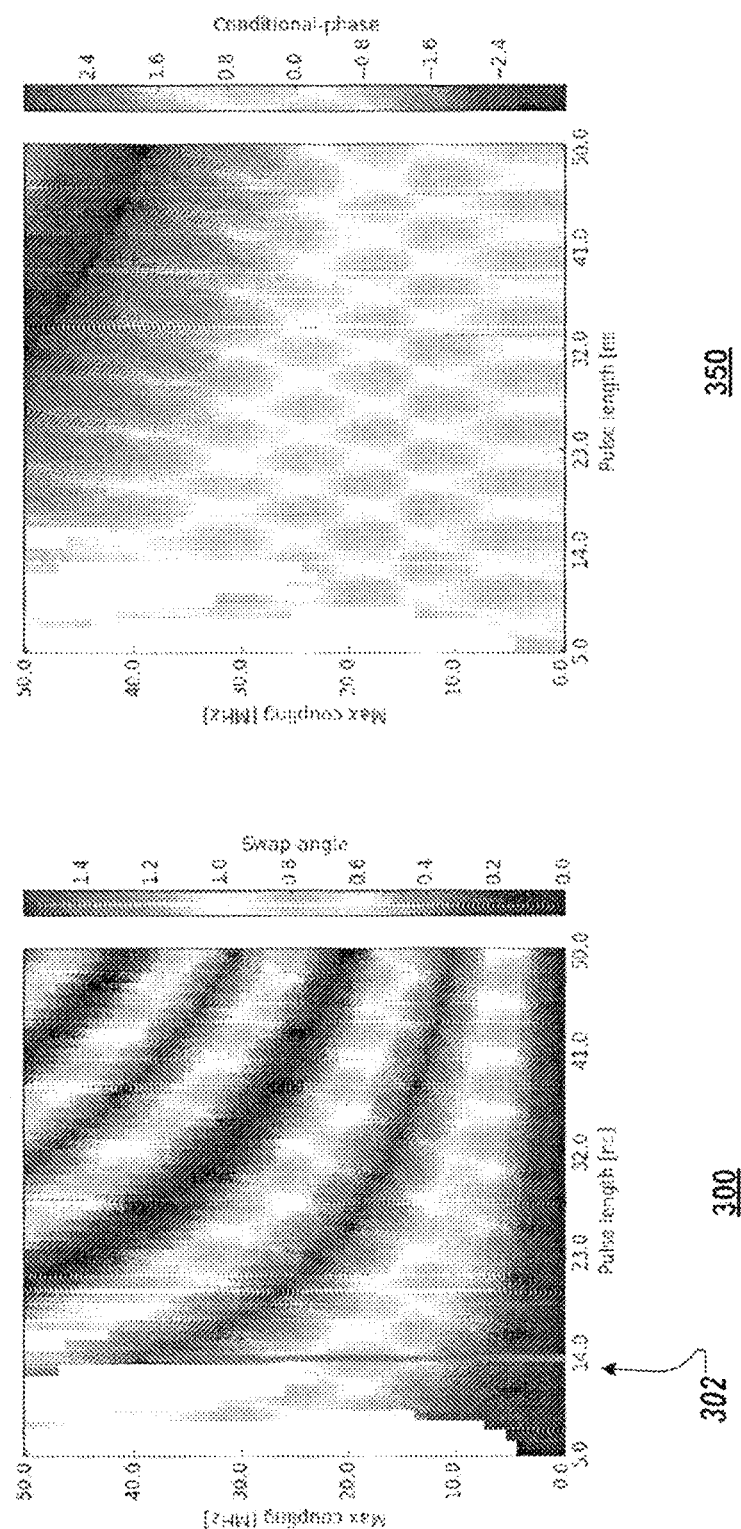
FIG. 3 shows numerical simulation results of swap gates.

FIG. 3 shows numerical simulation results of how to apply swap gates. Two plots are shown in FIG. 3. The first plot 300 includes an x axis representing the length of a control pulse (measured in ns) applied to implement a swap operation, e.g., the length of pulse 208c of FIG. 2. The y axis represents a maximum coupling strength (measured in MHz on a corresponding coupling wire) of the two qubits that are to undergo the swap operation. The plot 300 shows the different swap angles $\phi$ (as defined in control model U described above with reference to FIG. 2) that can be achieved for different values of pulse length T and maximum qubit coupling g, where $\phi$, T, g are related via $$\phi = \frac{3}{4}\pi T\left(\eta + \sqrt{8g^2 + \eta^2}\right)$$

with $\eta$ representing qubit non-linearity. In plots 300 and 350, $\eta$ is assumed to equal −200 MHz, it is assumed that the qubits are on resonance and that the control pulse is smooth, e.g., a raised cosine pulse. However, these assumptions are based on example hardware considerations, and may vary.

The plot 300 shows that by choosing control pulse duration equal to 14 ns (see vertical line 302), all swap angles between 0.0 and 1.5 can be achieved by sweeping the maximum voltage on the coupler wire from a voltage corresponding to a coupling of 0 MHz to a voltage corresponding to a coupling of 50 MHz. It is noted that other pulse durations can also achieve all swap angles between 0.0 and 1.5, however 14 ns is the lower bound in this example. White areas of the plot 300 represent areas of high leakage (of population or energy to non-computational basis states), e.g., leakage >0.1%.

The second plot 350 includes an x axis representing the length of a control pulse (measured in ns) applied to implement a swap operation, e.g., the length of pulse 208c of FIG. 2. The y axis represents a maximum coupling strength (measured in MHz) of the two qubits that are to undergo the swap operation. The plot 350 shows accumulation of unwanted CZ behavior—conditional phases θ (as defined in control model U described above with reference to FIG. 2)—that can be incurred for different values of pulse length and maximum qubit coupling during implementation of the swap operation of plot 300.

The second plot 350 shows that the swap operation of plot 300 is a swap operation—it is non-orthogonal to a controlled-z operation because the conditional phase θ is incurred at all pulse lengths when sweeping the maximum voltage on the coupler wire from a voltage corresponding to a coupling of 0 MHz to a voltage corresponding to a coupling of 50 MHz. However, at a fixed pulse length of 14 ns the conditional phase accumulation is minimal.

Both plots 300 and 350 show how, under the above described assumptions, any swap angle can be implemented in 14 ns with a maximum coupling strength between 0 and 50 MHz with minimal leakage.

Figure 4:
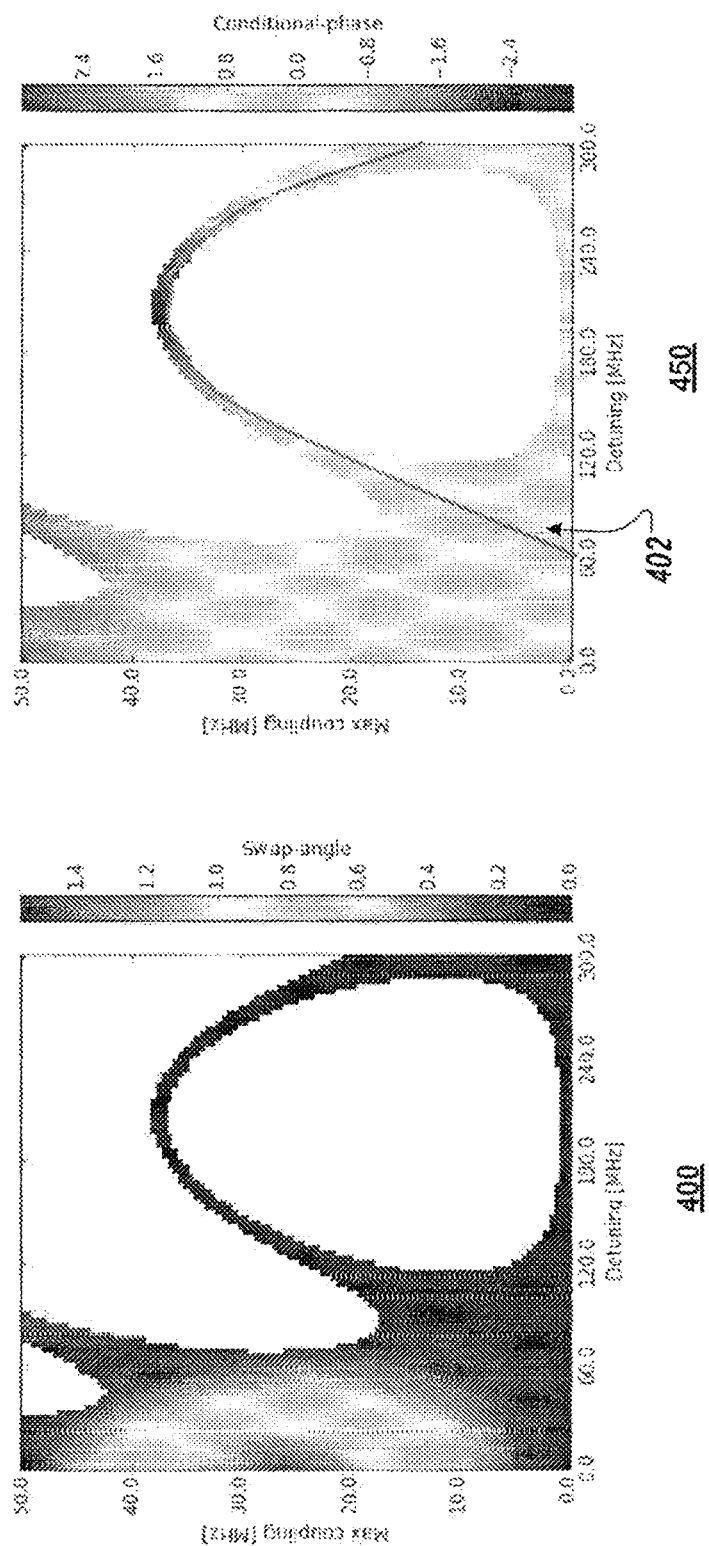
FIG. 4 shows numerical simulation results of controlled-z gates.

FIG. 4 shows numerical simulation results of how to apply controlled-Z gates. Two plots are shown in FIG. 4. The first plot 400 includes an x axis representing the detuning of the two qubits when a controlled-z operation is implemented (measured in MHz), e.g., the detuning of qubit 202 and 204 described with reference to FIG. 2. The y axis represents a maximum coupling strength (measured in MHz on a corresponding coupling wire) of the two qubits that are to undergo the controlled-z operation. In plots 400 and 450, η is assumed to equal −200 MHz, the pulse length used to implement the controlled-z operation is assumed to equal 20 ns and be smooth, e.g., a raised cosine pulse. However, these assumptions are based on example hardware considerations, and may vary.

Plot 400 shows unwanted swap angles φ that can be incurred for different values of pulse length and maximum qubit coupling during implementation of a controlled-z operation. As shown in plot 400, low detuning values of 60 MHz or less incur the most unwanted swap behavior.

Plot 450 shows that all conditional phase angles θ can be achieved between detuning values of 120 MHz and 300 MHz. Therefore, by choosing values of detuning and maximum coupling according to the parabolic line 402, any conditional phase angle can be implemented in 20 ns with minimal swap behavior.

Combining the results of FIGS. 3 and 4 shows how using the techniques described in this specification, namely the control model U and control sequence shown in FIG. 2, a combination of any swap angle and any conditional phase angle can be implemented in less than 35 ns.

Example Method for Implementing a Target Two-Qubit Quantum Logic Gate

FIG. 5 is a flow diagram of an example process 500 for implementing a target two-qubit quantum logic gate. For convenience, the process 500 will be described as being performed by quantum hardware in communication with control electronics located in one or more locations. For example, the system 100 of FIG. 1, appropriately programmed in accordance with this specification, can perform the process 500.

A control signal for the target two-qubit quantum logic gate is generated according to a control model (step 502). The control model includes a controlled-Z operator and a swap operator that are non-orthogonal. The control model may further include one or more detuning operators and a frequency shift operator. For example, the control model may include a first detuning operator multiplied by the swap operator multiplied by the controlled-Z operator multiplied by a second detuning operator multiplied by the frequency shift operator. An example expression for the control model is given above with reference to FIG. 2, and for convenience is repeated here:

$$U = e^{-i(\hat{I}\hat{Z}-\hat{Z}\hat{I})\delta_{-a}/4} e^{-i(\hat{X}\hat{X}+\hat{Y}\hat{Y})\theta/2} e^{-i\hat{Z}\hat{Z}\phi/4} e^{-i(\hat{I}\hat{Z}-\hat{Z}\hat{I})\delta_{-b}/4} e^{-i(\hat{I}\hat{Z}-\hat{Z}\hat{I})\delta_{+}/4},$$

where $\hat{I}$ represents the identity operator, $\hat{X}$ represents the Pauli-X operator, $\hat{Y}$ represents the Pauli-Y operator, $\hat{Z}$ represents the Pauli-Z operator, $\delta_{-a}$, $\delta_{-b}$ represent detuning operation parameters, θ represents a swap angle and φ represents a controlled-Z phase angle. In some cases the control model is photon conserving.

Generating the control signal may include determining values of the detuning operation parameters, swap angle and phase angle to respective values such that the control model represents the action of the target two-qubit quantum logic gate on a first qubit and a second qubit, and generating the control signal based on the determined values. Specific values of the detuning operation parameters, swap angle and phase angle can be determined using the calibration process described below with reference to FIG. 6.

The generated control signal is applied to the first qubit and second qubit to realize the target two-qubit evolution with accuracy above a predetermined threshold (step 504). Applying the control signal may include applying pulses to the first qubit and second qubit to detune the first qubit and second qubit. The first pulse may include one or more square pulses. A second pulse may be applied to a tunable coupler that couples the first qubit and the second qubit, where the second pulse implements the swap operator. When the second pulse is applied, the frequency of the first qubit and second qubit may adjusted such that the first qubit and second qubit are on resonance. In some implementations the second pulse may include a smooth pulse. A third pulse may be applied to the tunable coupler and one of the first qubit or second qubit, where the third pulse implements the controlled-Z operator. When the third pulse is applied to the tunable coupler and one of the first qubit or second qubit, the frequency of the first qubit or second qubit may also be adjusted.

The process 500 may be repeated to implement a sequence of target two-qubit quantum logic gates. In these implementations the steps 502 and 504 may be repeated for each two-qubit quantum logic gate in the sequence. At the end of the sequence, i.e., for a last target two-qubit quantum logic gate in the sequence of target two-qubit quantum logic gates, the first qubit and second qubit may be measured in the Z basis to obtain a result of the computation corresponding to the sequence of two-qubit quantum logic gates.

Figure 6:
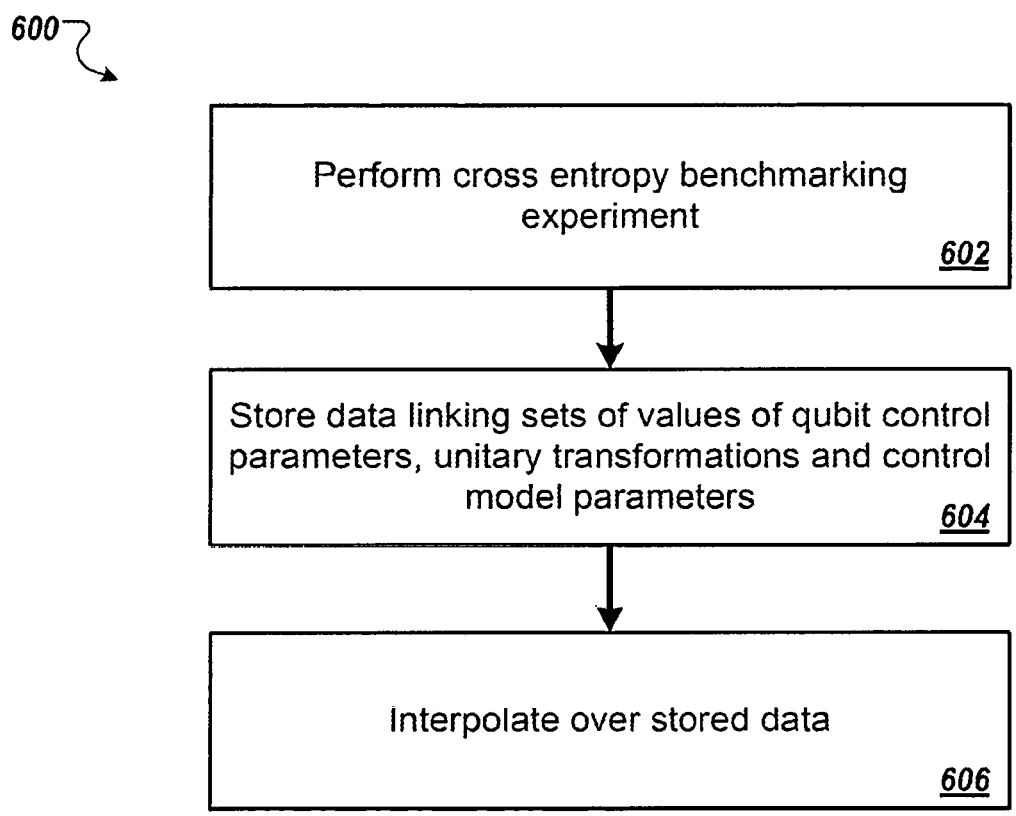
FIG. 6 is a flow chart of an example process for calibrating a swap gate or controlled-z gate.

FIG. 6 is a flow diagram of an example process 600 for calibrating control model parameters. For convenience, the process 600 will be described as being performed by quantum hardware in communication with control electronics located in one or more locations. For example, the system 100 of FIG. 1, appropriately programmed in accordance with this specification, can perform the process 600.

For each set of values of qubit control parameters, e.g., qubit voltage, coupler voltage and pulse length, from multiple sets of values of qubit control parameters, a cross-entropy benchmarking experiment is performed to identify a unitary transformation realized by the set of values of qubit control parameters (step 602).

As part of the cross entropy benchmarking experiment, values of control model parameters, e.g., values of the detuning operation parameters, swap angle and phase angle, that maximize the fidelity of the identified unitary transformation realized by the set of values of qubit control parameters are determined. For example, the length of the pulses can be determined based on data similar to that shown in FIG. 3. Referring to FIG. 3, it can be seen that for pulses >14 ns, it is possible to achieve all swap angles while avoided leakage (the white regions represent errors). The amplitudes of the pulses can be determined based on the data similar to that shown in FIG. 3 and FIG. 4. Referring to FIGS. 3 and 4, the axes labeled 'max coupling' could be varied by changing the pulse height of the coupler pulses, the axes labeled 'detuning' could be varied by changing the pulse height of the qubit pulses. These plots could then be used to determine a mapping between pulse heights and gate parameters. That is, scanning values of pulse lengths and pulse heights, and measuring the model parameters (using cross-entropy benchmarking), provides a map between pulse parameters and control model parameters.

Data linking the set of values of qubit control parameters, the unitary transformation the set of values realizes, and corresponding determined values of control model parameters is stored (604).

Unitary transformations and control model parameters corresponding to sets of values of qubit control parameters that are not included in the multiple sets of values of qubit control parameters are determined by interpolating over the stored data.

Implementations of the subject matter and operations described in this specification can be implemented in digital electronic circuitry, analog electronic circuitry, suitable quantum circuitry or, more generally, quantum computational systems, in tangibly-embodied software or firmware, in computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable computers, operating with one or more processors, as appropriate, executing one or more computer programs to perform functions by operating on input data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more computers to be "configured to" perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For example, a quantum computer may receive instructions from a digital computer that, when executed by the quantum computing apparatus, cause the apparatus to perform the operations or actions.

Computers suitable for the execution of a computer program can be based on general or special purpose processors, or any other kind of central processing unit. Generally, a central processing unit will receive instructions and data from a read-only memory, a random access memory, or quantum systems suitable for transmitting quantum data, e.g. photons, or combinations thereof.

The elements of a computer include a central processing unit for performing or executing instructions and one or more memory devices for storing instructions and digital, analog, and/or quantum data. The central processing unit and the memory can be supplemented by, or incorporated in, special purpose logic circuitry or quantum simulators. Generally, a computer will also include, or be operatively coupled to receive data from or transfer data to, or both, one or more mass storage devices for storing data, e.g., magnetic, magneto-optical disks, optical disks, or quantum systems suitable for storing quantum information. However, a computer need not have such devices.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

In certain cases, some or all of the quantum and/or classical circuit elements may be implemented using, e.g., superconducting quantum and/or classical circuit elements. Fabrication of the superconducting circuit elements can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of 1.2 kelvin) and niobium (superconducting critical temperature of 9.3 kelvin). Accordingly, superconducting structures, such as superconducting traces and superconducting ground planes, are formed from material that exhibits superconducting properties at or below a superconducting critical temperature.

In certain implementations, control signals for the quantum circuit elements (e.g., qubits and qubit couplers) may be provided using classical circuit elements that are electrically and/or electromagnetically coupled to the quantum circuit elements. The control signals may be provided in digital and/or analog form.

Computer-readable media suitable for storing computer program instructions and data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or system that may include one or more processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for implementing a target two-qubit quantum logic gate on a first qubit and second qubit using a tunable qubit coupler, the method comprising:
generating a control signal for the target two-qubit quantum logic gate according to a control model, wherein the control model comprises a controlled-Z operator and a swap operator that are non-orthogonal; and
applying the control signal to the first qubit, second qubit and tunable qubit coupler.

2. The method of claim 1, wherein the control model further comprises one or more detuning operators and a frequency shift operator.

3. The method of claim 2, wherein the control model comprises a first detuning operator multiplied by the swap operator multiplied by the controlled-Z operator multiplied by a second detuning operator multiplied by the frequency shift operator.

4. The method of claim 3, wherein generating the control signal for the target two-qubit quantum logic gate according to the control model comprises:
determining values of detuning operation parameters, a swap angle and a phase angle such that the control model represents the action of the target two-qubit quantum logic gate on the first qubit and the second qubit; and
generating the control signal based on the determined values.

5. The method of claim 4, wherein determining values of the detuning operation parameters, swap angle and phase angle comprises setting the detuning operation parameters, swap angle and phase angle to respective values that have been determined through a calibration procedure, the calibration procedure comprising:
for each set of values of qubit control parameters from multiple sets of values of qubit control parameters:
performing a cross-entropy benchmarking experiment using the set of values for the qubit control parameters to identify a unitary transformation realized by the set of values of qubit control parameters, comprising determining values of control model parameters that maximize the fidelity of the identified unitary transformation;
storing data linking the set of values of qubit control parameters, the unitary transformation the set of values realizes, and corresponding determined values of control model parameters;
interpolating over the stored data to determine unitary transformations and the control model parameters corresponding to sets of values of qubit control parameters that are not included in the multiple sets of values of qubit control parameters.

6. The method of claim 5, wherein qubit control parameters comprise qubit voltage, qubit coupler voltage and pulse length.

7. The method of claim 1, wherein the control model is photon-conserving.

8. The method of claim 1, wherein the control model is given by $$U = e^{-i(\hat{I}\hat{Z} - \hat{Z}\hat{I})\delta_{-a}/4} e^{-i(\hat{X}\hat{X} + \hat{Y}\hat{Y})\theta/2} e^{-i\hat{Z}\hat{Z}\phi/4} e^{-i(\hat{I}\hat{Z} - \hat{Z}\hat{I})\delta_{-b}/4} e^{-i(\hat{I}\hat{Z} - \hat{Z}\hat{I})\delta_{+}/4}$$

where $\hat{I}$ represents the identity operator, $\hat{X}$ represents the Pauli-X operator, $\hat{Y}$ represents the Pauli-Y operator, $\hat{Z}$ represents the Pauli-Z operator, $\delta_{-a}$, $\delta_{-b}$ represent detuning operation parameters, $\theta$ represents a swap angle and $\phi$ represents a controlled-Z phase angle.

9. The method of claim 1, wherein application of the control signal to the first qubit, second qubit and tunable qubit coupler realizes a target two-qubit evolution that represents the target two-qubit quantum logic gate with accuracy above a predetermined threshold.

10. The method of claim 1, wherein applying the control signal to the first qubit, the second qubit and the tunable qubit coupler comprises:
applying a first pulse to the first qubit and second qubit, wherein the first pulse detunes the first qubit and second qubit;
applying a second pulse to the tunable coupler that couples the first qubit and the second qubit, wherein the second pulse implements the swap operator; and
applying a third pulse to the tunable coupler and one of the first qubit or second qubit, wherein the third pulse implements the controlled-Z operator.

11. The method of claim 10, wherein applying a second pulse to the tunable coupler further comprises adjusting the frequency of the first and second qubit such that the first qubit and second qubit are on resonance.

12. The method of claim 10, wherein applying the third pulse to the tunable coupler and one of the first qubit or second qubit comprises adjusting the frequency of the first qubit or second qubit.

13. The method of claim, 10, wherein the first pulse comprises one or more square pulses.

14. The method of claim 10, wherein the second pulse comprises a smooth pulse.

15. A method comprising:
implementing a two-qubit quantum logic gate using a first qubit, a second qubit and a tunable qubit coupler, wherein implementing the two-qubit gate comprises implementing a controlled-Z operation and implementing a swap operation, wherein the controlled-Z operation and the swap operation are non-orthogonal.

16. The method of claim 15, wherein implementing the two-qubit quantum logic gate using a first qubit, a second qubit and a qubit coupler comprises:
applying a first pulse to the first qubit and second qubit, wherein the first pulse detunes the first qubit and second qubit;
applying a second pulse to the tunable coupler that couples the first qubit and the second qubit, wherein the second pulse implements the swap operator; and
applying a third pulse to the tunable coupler and one of the first qubit or second qubit, wherein the third pulse implements the controlled-Z operator.

17. The method of claim 16, wherein applying the second pulse to the tunable coupler further comprises adjusting the frequency of the first and second qubit such that the first qubit and second qubit are on resonance.

18. The method of claim 16, wherein applying the third pulse to the tunable coupler and one of the first qubit or second qubit comprises adjusting the frequency of the first qubit or second qubit.

19. The method of claim, 16, wherein the first pulse comprises one or more square pulses.

20. The method of claim 16, wherein the second pulse comprises a smooth pulse.

21. The method of claim 16, wherein the first pulse, second pulse, and third pulse are determined using a photon conserving control model given by $$U = e^{-i(\hat{I}\hat{Z}-\hat{Z}\hat{I})\delta_{-a}/4} e^{-i(\hat{X}\hat{X}+\hat{Y}\hat{Y})\theta/2} e^{-i\hat{Z}\hat{Z}\phi/4} e^{-i(\hat{I}\hat{Z}-\hat{Z}\hat{I})\delta_{-b}/4} e^{-i(\hat{I}\hat{Z}-\hat{Z}\hat{I})\delta_{+}/4}$$

where $\hat{I}$ represents the identity operator, $\hat{X}$ represents the Pauli-X operator, $\hat{Y}$ represents the Pauli-Y operator, $\hat{Z}$ represents the Pauli-Z operator, $\delta_{-a}$, $\delta_{-b}$ represent detuning operation parameters, $\theta$ represents a swap angle for the swap operator and $\phi$ represents a controlled-Z phase angle for the controlled-Z operator.

22. The method of claim 21, wherein determining the first pulse, second pulse and third pulse using the control model comprises:
determining values of detuning operation parameters, a swap angle and a phase angle such that the control model represents the action of the target-two-qubit quantum logic gate on the first qubit and the second qubit.

23. The method of claim 22, wherein determining values of the detuning operation parameters, swap angle and phase angle comprises setting the detuning operation parameters, swap angle and phase angle to respective values that have been determined through a calibration procedure, the calibration procedure comprising:
for each set of values of qubit control parameters from multiple sets of values of qubit control parameters:
performing a cross-entropy benchmarking experiment using the set of values for the qubit control parameters to identify a unitary transformation realized by the set of values of qubit control parameters, comprising determining values of control model parameters that maximize the fidelity of the identified unitary transformation;
storing data linking the set of values of qubit control parameters, the unitary transformation the set of values realizes, and corresponding determined values of control model parameters;
interpolating over the stored data to determine unitary transformations and the control model parameters corresponding to sets of values of qubit control parameters that are not included in the multiple sets of values of qubit control parameters.

24. The method of claim 23, wherein qubit control parameters comprise qubit voltage, qubit coupler voltage and pulse length.

25. The method of claim 16, wherein implementing the two-qubit quantum logic gate comprises implementing the two-qubit quantum logic gate with accuracy above a predetermined threshold.

26. An apparatus for implementing a target two-qubit quantum logic gate, the apparatus comprising:
a first qubit coupled to a second qubit via a tunable coupler;
control electronics comprising one or more processors; and
a non-transitory computer storage medium encoded with instructions that, when executed by the one or more processors, cause the control electronics to perform operations comprising:
generate a control signal for the target two-qubit quantum logic gate according to a control model, wherein the control model comprises a controlled-Z operator and a swap operator that are non-orthogonal; and
apply the control signal to the first qubit, second qubit and tunable qubit coupler.

27. An apparatus for implementing a two-qubit quantum logic gate, the apparatus comprising:
a first qubit coupled to a second qubit via a tunable qubit coupler;
control electronics comprising one or more processors; and
a non-transitory computer storage medium encoded with instructions that, when executed by the one or more processors, cause the control electronics to provide one or more control signals to the first qubit, second qubit, and tunable coupler to implement a controlled-Z operation and a swap operation, wherein the controlled-Z operation and the swap operation are non-orthogonal.

* * * * *